US011922361B2

(12) United States Patent
Kawaguchi et al.

(10) Patent No.: US 11,922,361 B2
(45) Date of Patent: Mar. 5, 2024

(54) DISTRIBUTION SYSTEM (71) Applicant: FUJI CORPORATION, Aichi-ken (JP)

(72) Inventors: Koji Kawaguchi, Kasugai (JP); Takeshi Sato, Nagoya (JP)

(73) Assignee: FUJI CORPORATION, Aichi-ken (JP)

( * ) Notice: Subject to any disclaimer, the term of this patent is extended or adjusted under 35 U.S.C. 154(b) by 6 days.

(21) Appl. No.: 17/629,421

(22) PCT Filed: Jul. 26, 2019

(86) PCT No.: PCT/JP2019/029405
§ 371 (c)(1),
(2) Date: Jan. 24, 2022

(87) PCT Pub. No.: WO2021/019596
PCT Pub. Date: Feb. 4, 2021

(65) Prior Publication Data
US 2022/0292436 A1    Sep. 15, 2022

(51) Int. Cl.
*G06Q 10/08* (2023.01)
*G06Q 10/083* (2023.01)

(52) U.S. Cl.
CPC .................... *G06Q 10/083* (2013.01)

(58) Field of Classification Search
CPC ............. G06Q 10/087; G06Q 10/0833; G06Q 10/0631; G06Q 10/06316;
(Continued)

(56) References Cited
U.S. PATENT DOCUMENTS

2016/0129592 A1* 5/2016 Saboo ................... G05D 1/0297
700/248
2017/0278176 A1* 9/2017 Valkov .................... B65B 57/00
(Continued)

FOREIGN PATENT DOCUMENTS

JP  2011105469  6/2011
JP  2013041527  2/2013
(Continued)

OTHER PUBLICATIONS

"Distribution Center Robotics Come of Age." Industrial Maintenance & Plant Operation (2018): n/a. ProQuest. Web. Dec. 19, 2023. (Year: 2018).*
(Continued)

*Primary Examiner* — Michael P Harrington
(74) *Attorney, Agent, or Firm* — JCIPRNET (57) ABSTRACT

A distribution system is linked to a delivery vehicle delivering a product stored in a warehouse to a delivery destination and includes an automatic conveyance device and an automatic conveyance device server. An automatic conveyance device server transmits a release instruction to an automatic conveyance device when receiving a request for delivery, transmits a loading instruction for loading of a product to a delivery vehicle to the automatic conveyance device when receiving loading permission, and transmits a release completion notification to a transmitter of a delivery request when receiving information indicating the releasing is completed. An automatic conveyance device picks up a designated product in a warehouse when receiving a release instruction, loads the picked-up product to a delivery vehicle standing by at a standby position when receiving a loading instruction, and transmits information indicating that release is completed to the automatic conveyance device server when loading work is completed.

2 Claims, 6 Drawing Sheets

(58) Field of Classification Search
CPC ......... G06Q 10/06313; G06Q 10/0633; G06Q 10/08; G06Q 10/083; G06Q 50/28; G06Q 10/0834; G06Q 10/08355
See application file for complete search history.

(56) References Cited

U.S. PATENT DOCUMENTS

| | | | |
|---|---|---|---|
| 2017/0357270 A1* | 12/2017 | Russell | G06V 20/58 |
| 2018/0024554 A1* | 1/2018 | Brady | G06Q 10/0833 |
| | | | 701/23 |
| 2018/0215546 A1* | 8/2018 | High | G05D 1/0297 |
| 2018/0247261 A1* | 8/2018 | Smith | G06Q 10/0833 |
| 2019/0066041 A1* | 2/2019 | Hance | G01C 21/3407 |

FOREIGN PATENT DOCUMENTS

| | | |
|---|---|---|
| JP | 2015514256 | 5/2015 |
| JP | 2019516185 | 6/2019 |
| WO | 2013148123 | 10/2013 |

OTHER PUBLICATIONS

"International Search Report (Form PCT/ISA/210) of PCT/JP2019/029405," dated Oct. 29, 2019, with English translation thereof, pp. 1-4.

* cited by examiner

| INVENTORY | | | |
|---|---|---|---|
| PRODUCT ID | CONTENTS | SHELF NO. | NUMBER OF INVENTORIES |
| 1 | CABBAGE | a-1~a-10 | 1000 |
| 2 | CUCUMBER | b-1~b-20 | 500 |
| 3 | TOMATO | c-1~c-5 | 250 |

| CART TRANSFER DATA ||||| 
|---|---|---|---|---|
| ORDERER | PRODUCT ID | NUMBER OF PIECES | CART ID | CART POSITION |
| RETAIL STORE A | 1 | 4 | x-1001 | P001 |
| | 1 | 4 | x-1002 | P002 |
| | 1 | 2 | x-1003 | P003 |
| | 2 | 2 | x-1003 | P003 |
| | 2 | 3 | x-1004 | P004 |
| | 3 | 1 | x-1004 | P004 |
| RETAIL STORE B | 1 | 0 | - | - |
| | 2 | 4 | x-2001 | P005 |
| | 2 | 4 | x-2002 | P006 |
| | 2 | 2 | x-2003 | P007 |
| | 3 | 2 | x-2003 | P007 |
| | 3 | 3 | x-2004 | P008 |

FIG. 6

| DELIVERY ROUTE ||||
|---|---|---|---|
| DELIVERY VEHICLE | FINAL DESTINATION | CART ID | EMBARKING SEQUENCE |
| DELIVERY VEHICLE A | RETAIL STORE A | x-1001 | N/A |
| | RETAIL STORE A | x-1002 | N/A |
| | RETAIL STORE A | x-1003 | N/A |
| DELIVERY VEHICLE B | RETAIL STORE B | x-2001 | N/A |
| | RETAIL STORE B | x-2002 | N/A |
| | RETAIL STORE B | x-2003 | N/A |
| DELIVERY VEHICLE C | RETAIL STORE A | x-1004 | 2 |
| | RETAIL STORE B | x-2004 | 1 |

FIG. 7

| LOADING INSTRUCTION | | | | |
|---|---|---|---|---|
| AGV | EMBARKING DESTINATION | CART ID | EMBARKING SEQUENCE | DELIVERY VEHICLE POSITION |
| AGV-1 | DELIVERY VEHICLE A | x-1001 | N/A | C10 |
| | DELIVERY VEHICLE A | x-1002 | N/A | C10 |
| | DELIVERY VEHICLE A | x-1003 | N/A | C10 |
| | DELIVERY VEHICLE B | x-2001 | N/A | C21 |
| AGV-2 | DELIVERY VEHICLE B | x-2002 | N/A | C21 |
| | DELIVERY VEHICLE B | x-2003 | N/A | C21 |
| | DELIVERY VEHICLE C | x-1004 | 2 | C50 |
| | DELIVERY VEHICLE C | x-2004 | 1 | C50 |

FIG. 8

| UNLOADING INSTRUCTION TO RETAIL STORE A | | | | |
|---|---|---|---|---|
| AGV | EMBARKING DESTINATION | CART ID | DELIVERY VEHICLE POSITION | DELIVERY VEHICLE ID |
| AGV-100 | BA01 | x-1001 | AA05 | DELIVERY VEHICLE A |
| | BA02 | x-1002 | AA05 | DELIVERY VEHICLE A |
| | BA10 | x-1003 | AA05 | DELIVERY VEHICLE A |
| AGV-101 | BZ11 | x-1004 | AA21 | DELIVERY VEHICLE C |

FIG. 9

| UNLOADING INSTRUCTION TO RETAIL STORE B | | | | |
|---|---|---|---|---|
| AGV | EMBARKING DESTINATION | CART ID | DELIVERY VEHICLE POSITION | DELIVERY VEHICLE ID |
| AGV-200 | BB05 | x-2001 | AB03 | DELIVERY VEHICLE B |
| | BB06 | x-2002 | AB03 | DELIVERY VEHICLE B |
| | BB10 | x-2003 | AB03 | DELIVERY VEHICLE B |
| AGV-201 | B011 | x-2004 | AB15 | DELIVERY VEHICLE C |

FIG. 10

DISTRIBUTION SYSTEM

CROSS-REFERENCE TO RELATED APPLICATION

This application is a 371 application of the International PCT application serial no. PCT/JP2019/029405, filed on Jul. 26, 2019. The entirety of the above-mentioned patent application is hereby incorporated by reference herein and made a part of this specification.

TECHNICAL FIELD

The present specification discloses a distribution system.

BACKGROUND ART

Conventionally, a system for delivering a product ordered by a customer to a delivery destination has been known. For example, Patent Literature 1 discloses that, when a customer orders a product with a designated destination, the ordered product is selected from inventory in a transportation management facility and transported to a collection location (relay station), and when arriving at the collection location, the ordered product is collected from the collection location by a carrier to be delivered to a final destination.

PATENT LITERATURE

Patent Literature 1: JP-T-2015-514256

SUMMARY OF THE INVENTION

Technical Problem

Patent Literature 1 describes that an ordered product is transported to a final destination via a relay station but does not describe a form of transportation. Recently, automatic driving vehicles have been actively developed, and it is desirable to construct a more efficient distribution system by using the automatic driving vehicles.

A principal object of the present disclosure is to provide a more efficient distribution system linked to a delivery vehicle that can perform automatic driving.

Solution to Problem

The present disclosure adopts following means to achieve the principal object described above.

A distribution system of the present disclosure is a distribution system linked to a delivery vehicle that delivers a product stored in a warehouse from the warehouse to a delivery destination, and includes an automatic conveyance device disposed in the warehouse and an automatic conveyance device server configured to manage an operation of the automatic conveyance device by exchanging information with the automatic conveyance device by wireless communication, in which, the automatic conveyance device server transmits a release instruction to the automatic conveyance device when receiving a request for delivery of a designated product to a designated delivery destination, transmits a loading instruction for loading of the product to the delivery vehicle to the automatic conveyance device when receiving loading permission that permits loading of the product to the delivery vehicle based on arrival of the delivery vehicle at a standby position in the warehouse, and transmits a release completion notification to a transmitter of a request for the delivery when receiving information indicating that release of the product is completed from the automatic conveyance device, and the automatic conveyance device picks up the designated product in the warehouse when receiving the release instruction from the automatic conveyance device server, loads the picked-up product to the delivery vehicle standing by at the standby position of the warehouse when receiving the loading instruction from the automatic conveyance device server, and transmits information indicating that release is completed to the automatic conveyance device server when loading work is completed.

A distribution system of the present disclosure is a system linked to a delivery vehicle that delivers a product stored in a warehouse from the warehouse to a delivery destination. A distribution system includes an automatic conveyance device disposed in a warehouse and an automatic conveyance device server that can perform wireless communication with the automatic conveyance device. An automatic conveyance device server transmits a release instruction to an automatic conveyance device when receiving a request for delivery of a designated product to a designated delivery destination. Further, an automatic conveyance device server transmits a loading instruction for loading of a product to a delivery vehicle to an automatic conveyance device when receiving loading permission that permits loading of the product to the delivery vehicle based on arrival of the delivery vehicle at a standby position in a warehouse. Further, an automatic conveyance device server transmits a release completion notification to a transmitter of a request for delivery when receiving information indicating that release of a product is completed from an automatic conveyance device. An automatic conveyance device picks up a designated product in a warehouse when receiving a release instruction from an automatic conveyance device server. Further, an automatic conveyance device loads a picked-up product to a delivery vehicle standing by at a standby position of a warehouse when receiving a loading instruction from an automatic conveyance device server, and transmits information indicating that release is completed to an automatic conveyance device server when loading work is completed. Thereby, a product can be smoothly and automatically released, and a more efficient distribution system can be made by being linked to a delivery vehicle that can perform automatic driving.

DESCRIPTION OF EMBODIMENTS

Next, an embodiment of the present disclosure will be described with reference to the drawings.

Figure 1:
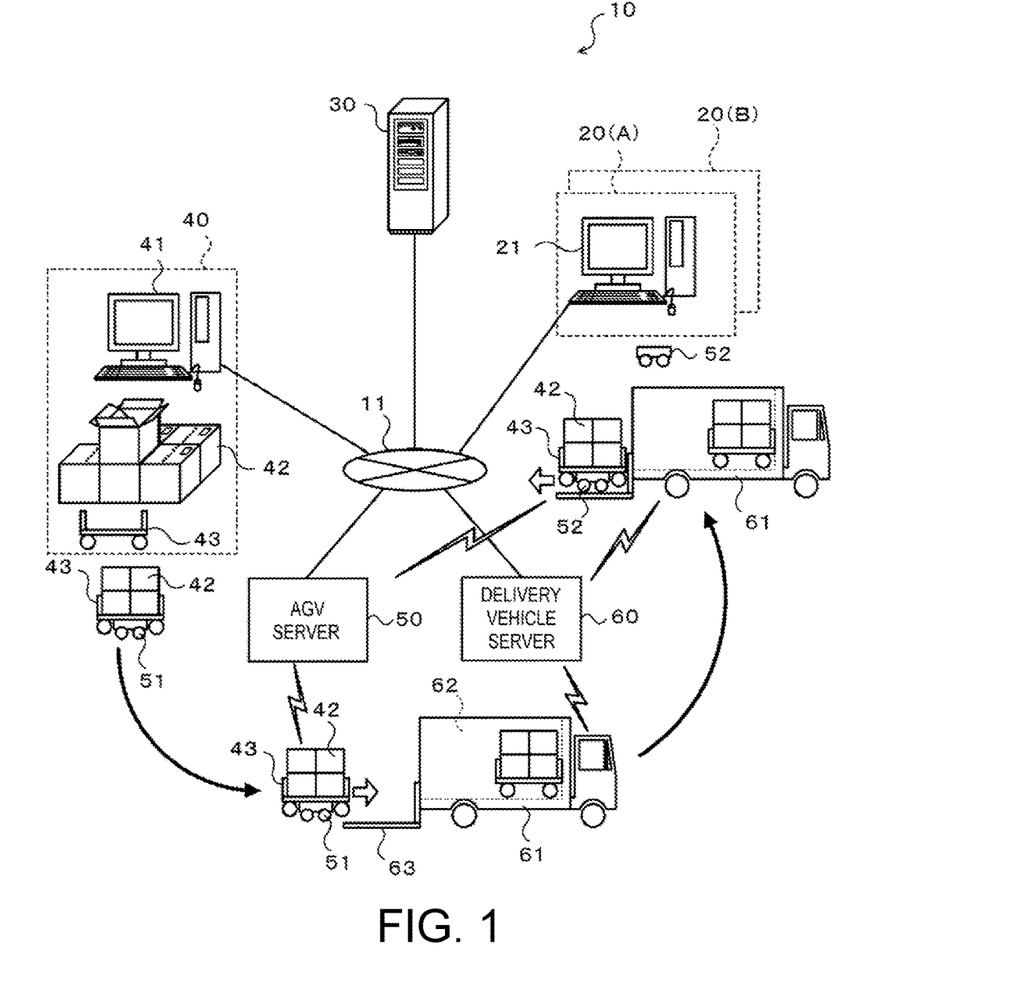
FIG. 1 is a configuration diagram illustrating a schematic configuration of a distribution system.

FIG. 1 is a configuration diagram illustrating a schematic configuration of a distribution system. As illustrated in FIG. 1, distribution system 10 includes retail store computer 21, sales management server 30, warehouse computer 41, AGV server 50, automated guided vehicles (AGVs) 51 and 52, delivery vehicle server 60, and delivery vehicle 61. Retail store computer 21, sales management server 30, warehouse computer 41, AGV server 50, and delivery vehicle server 60 are connected to each other via network 11.

Figure 2:
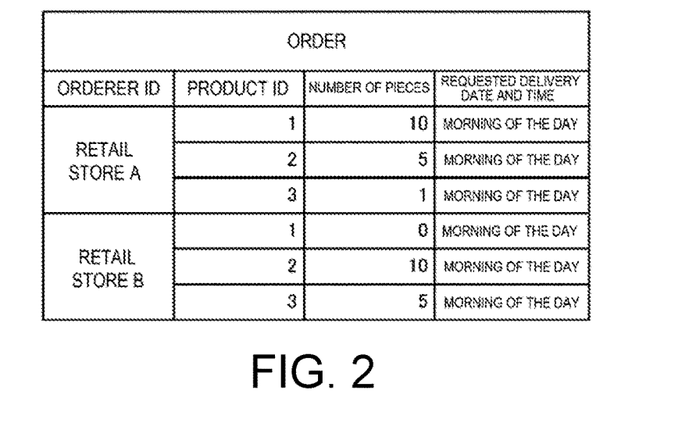
FIG. 2 is an explanatory diagram illustrating an example of purchase order data.

Retail store computer 21 is installed in each of multiple retail stores 20 (20A and 20B). Each of retail stores 20A and 20B orders product 42 from sales management server 30 by transmitting purchase order data from retail store computer 21 to sales management server 30. FIG. 2 is an explanatory diagram illustrating an example of purchase order data. As illustrated in FIG. 2, the purchase order data includes an order ID for identifying an order (retail store), a product ID for identifying ordered product 42, the number of ordered products 42, and requested delivery date and time of ordered product 42. Further, in each of retail stores 20A and 20B, an AGV 52 for unloading the delivered product 42 is disposed.

Figure 3:
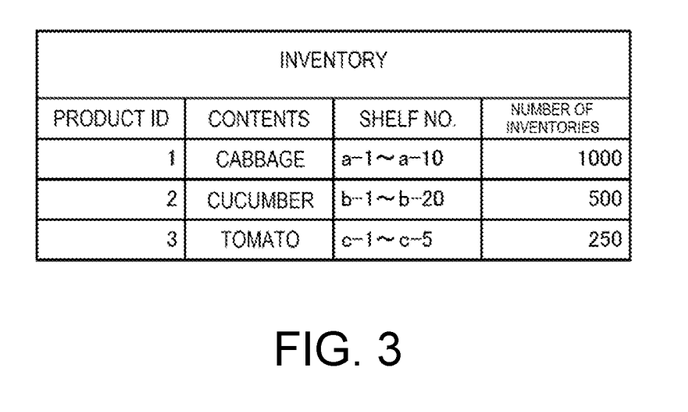
FIG. 3 is an explanatory diagram illustrating an example of inventory data.

Sales management server 30 manages sales of product 42 for retail stores 20A and 20B. When receiving purchase order data from retail store computers 21 of retail stores 20A and 20B, sales management server 30 checks inventory of products 42 stored in warehouse 40 and transmits a release preparation instruction for product 42 to warehouse computer 41 or transmits a release instruction for product 42 to AGV server 50 or transmits a delivery instruction for product 42 to delivery vehicle server 60. Sales management server 30 includes a database. The database stores inventory data for managing inventory of products 42 stored in warehouse 40. FIG. 3 is an explanatory diagram illustrating an example of inventory data. As illustrated in FIG. 3, the inventory data includes a product ID, contents of products 42, a shelf number (shelf No.) of a storage shelf in which products 42 are stored, and the number of inventories of products 42.

Warehouse computer 41 is installed in warehouse 40. In addition to storing many products 42, AGV 51 and cart 43 are disposed in warehouse 40. Cart 43 can embark up to a predetermined number (for example, four) of products 42 on an upper surface of a bottom plate with wheels. When receiving a release preparation instruction from sales management server 30, warehouse computer 41 instructs a worker of warehouse 40 to prepare for release. The release preparation instruction includes an orderer ID (delivery destination) included in purchase order data, a product ID, quantity, and a shelf number (shelf No.) included in inventory data. When receiving the release preparation instruction from warehouse computer 41, the worker of warehouse 40 takes out a required number of ordered products 42 from a storage shelf and transfers the products to cart 43. When all products 42 ordered by one orderer cannot be put into one cart 43 (in the present embodiment, when the number of products 42 ordered by one orderer exceeds four), the worker transfers the ordered products 42 to multiple carts 43. Transfer of products 42 to cart 43 may be performed by installing a work robot in warehouse 40 to use the work robot. Product 42 transferred to cart 43 is released from warehouse 40 by being conveyed by AGV 51 together with cart 43.

AGV server 50 exchanges information with AGVs 51 and 52 through wireless communication to manage operations of AGVs 51 and 52. In the present embodiment, AGVs 51 and 52 are configured as a floor surface traveling type automatic conveyance device (unmanned conveyance vehicle) traveling on a floor surface. AGVs 51 and 52 each include a lifter (not illustrated) that can be lifted and lowered on an upper portion of a housing. Each of AGVs 51 and 52 drives under a bottom plate of cart 43 and lifts the lifter to push up cart 43 to be separated from a floor surface, and travels in this state, thereby moving cart 43. AGVs 51 and 52 may be connected to cart 43 to travel, thereby towing cart 43.

Delivery vehicle server 60 manages an operation of delivery vehicle 61 by exchanging information with delivery vehicle 61 through wireless communication. In the present embodiment, delivery vehicle 61 is configured as an automatic driving vehicle capable of automatically traveling along a travel route by designating the travel route in advance. Further, delivery vehicle 61 includes a global positioning system (GPS) to acquire a current position as necessary and transmit the current position to delivery vehicle server 60.

Delivery vehicle 61 includes luggage compartment 62 in which a predetermined number (for example, three) of carts 43 can be embarked. Further, tailgate lifter 63 for assisting loading and unloading of luggage to and from luggage compartment 62 is attached to a rear portion of a vehicle body of delivery vehicle 61. Tailgate lifter 63 can be lifted and lowered with respect to the vehicle body with the luggage compartment 62 open and is on a road surface when lowered to a lowering end and is on a floor surface of luggage compartment 62 when lifted to a lifting end. Thus, AGVs 51 and 52 can move to tailgate lifter 63 (upper surface) with in a state where tailgate lifter 63 is lowered and move to luggage compartment 62 by lifting tailgate lifter 63 from this state. That is, AGVs 51 and 52 can enter into and exit from luggage compartment 62 of delivery vehicle 61. Thereby, AGVs 51 and 52 can put cart 43 on which product 42 is embarked in and out luggage compartment 62.

Figure 4:
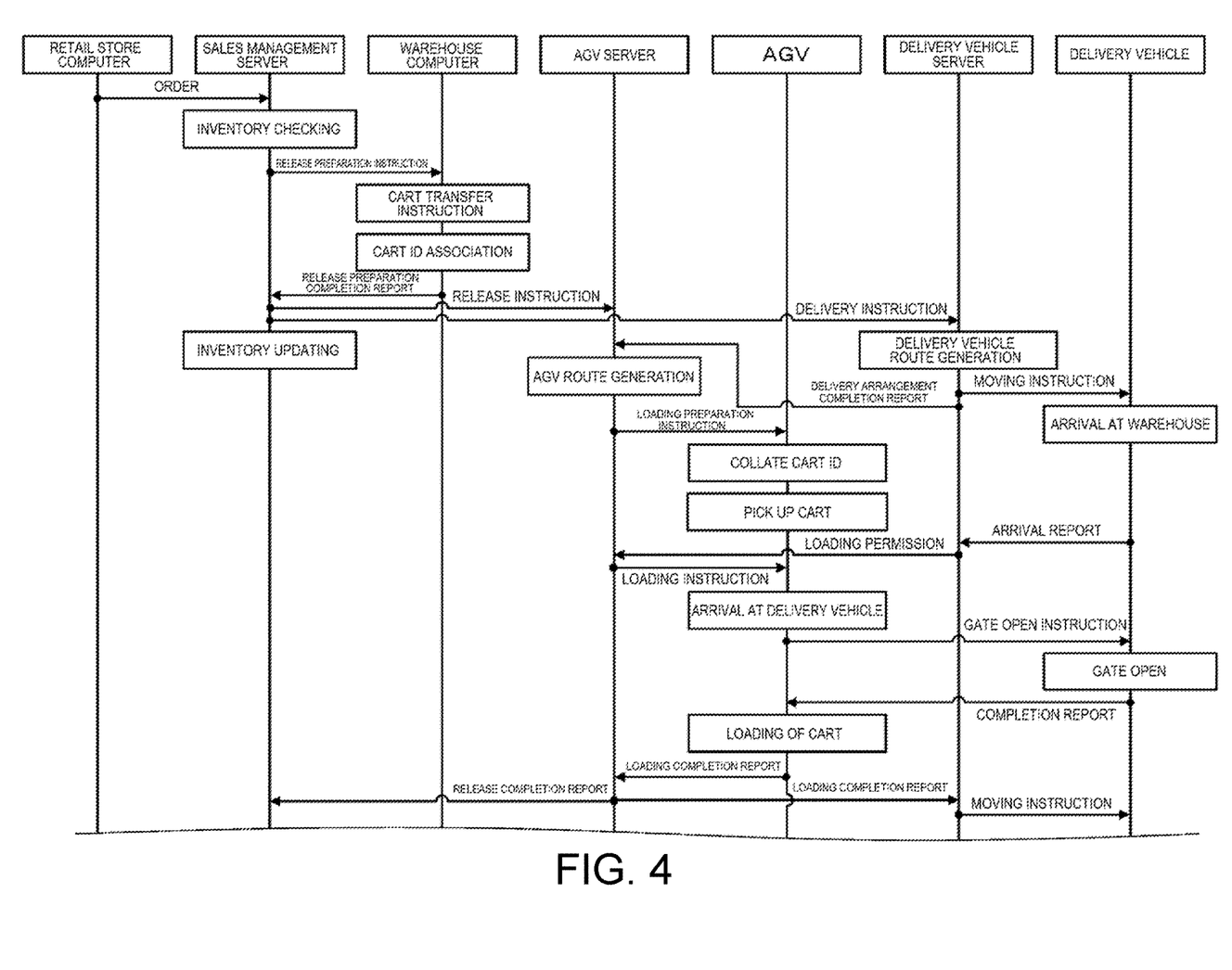
FIG. 4 is a sequence diagram of a distribution system.
Figure 5:
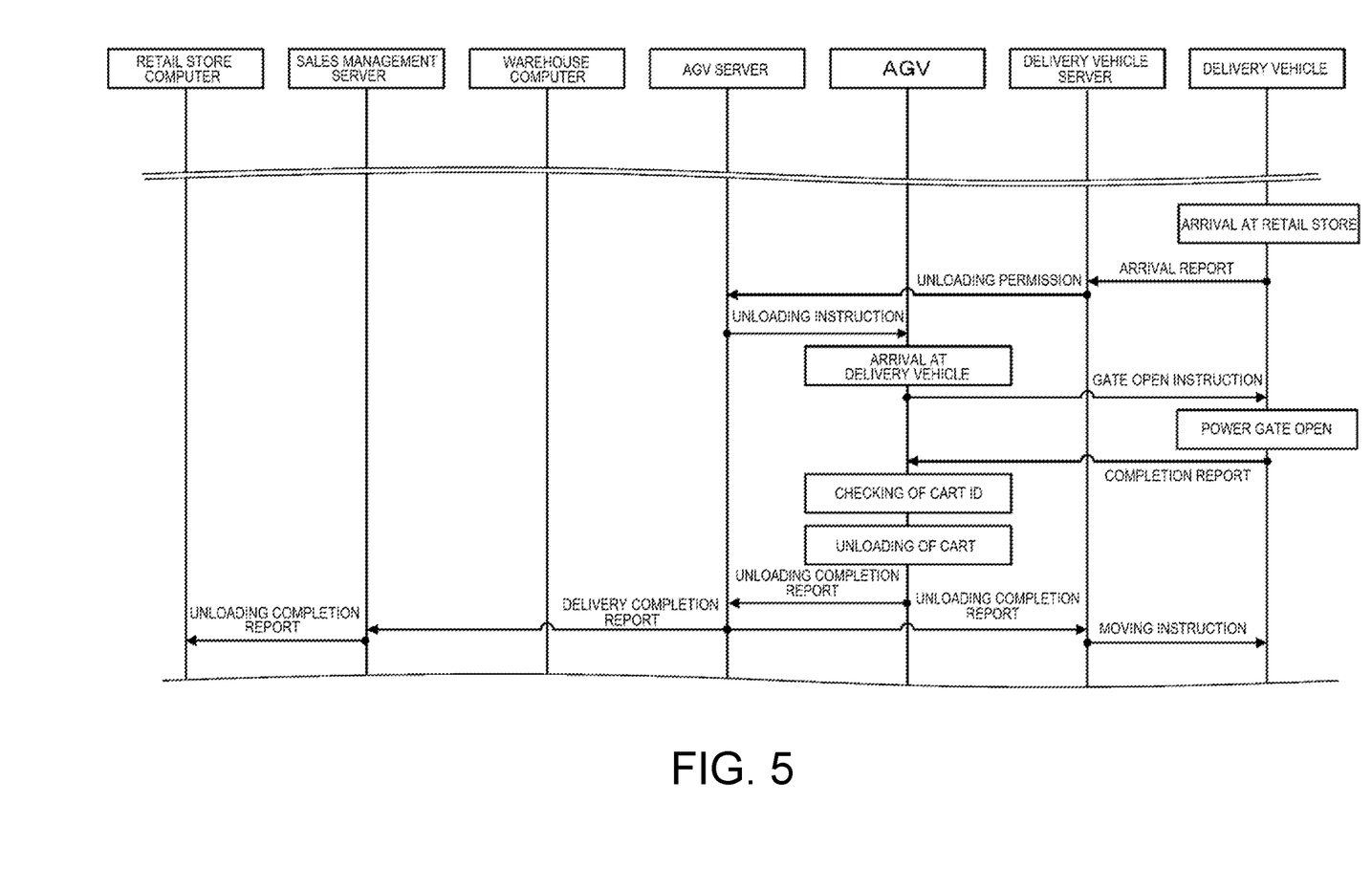
FIG. 5 is a sequence diagram of a distribution system.

Next, an operation of distribution system 10 configured in this way will be described. FIGS. 4 and 5 are sequence diagrams of distribution system 10.

Figure 6:
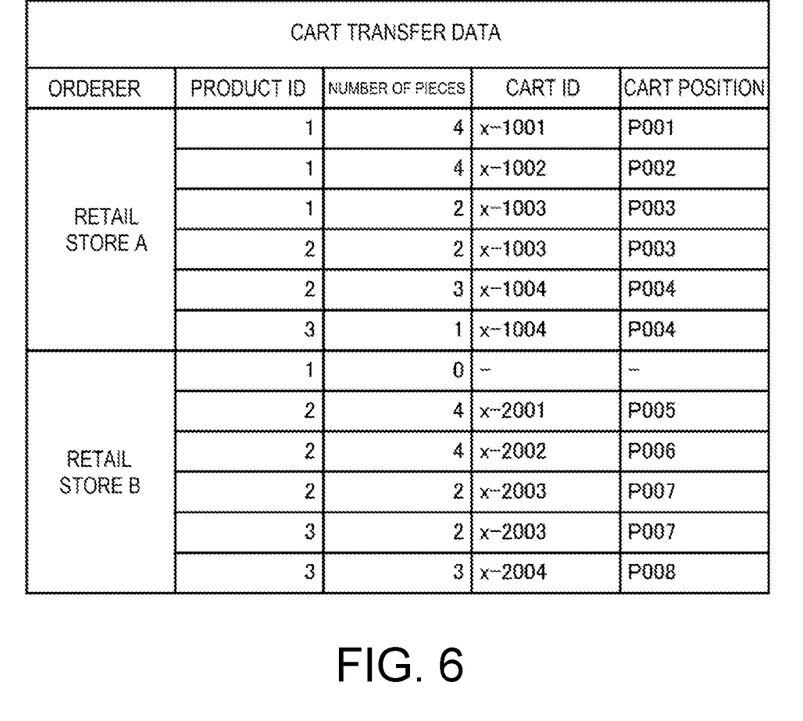
FIG. 6 is an explanatory diagram illustrating an example of cart transfer data.

As illustrated in the drawings, sales management server 30 accepts an order by receiving purchase order data from retail store computers 21 installed in each of multiple retail stores 20. When receiving the purchase order data, sales management server 30 checks whether there is inventory for ordered product 42 in warehouse 40 by using inventory data, and when there is no inventory for ordered product 42, sales management server 30 transmits the fact that there is no inventory to retail store computer 21. Meanwhile, when there is inventory for ordered product 42, sales management server 30 transmits a release preparation instruction to warehouse computer 41. When receiving the release preparation instruction, warehouse computer 41 instructs a worker in warehouse 40 to embark ordered product 42 onto cart 43. The worker takes out ordered product 42 from the storage shelf and transfers ordered product 42 to cart 43 and moves ordered product 42 to a predetermined standby position and also reads a barcode attached to corresponding product 42 and a barcode attached to corresponding cart 43 by using a possessed portable information terminal. Here, the barcode of product 42 includes a product ID of corresponding product 42, and the barcode of cart 43 includes a cart ID of corresponding cart 43. The read barcode data is transmitted to warehouse computer 41. Warehouse computer 41 generates cart transfer data in which the received product ID and cart ID are associated with each other and transmits the generated cart transfer data to sales management server 30 together with a release preparation completion report. FIG. 6 is an explanatory diagram illustrating an example of cart transfer data. As illustrated in FIG. 6, the cart transfer data includes the product ID and the cart ID and includes the number of transferred product 42 and a standby position (cart position) of transferred cart 44.

When receiving the cart transfer data, sales management server 30 updates inventory data based on the received cart transfer data. The inventory data is updated by decrementing the number of inventories of the product ID matching the product ID represented in the received cart transfer data by the number represented in the cart transfer data. Further, sales management server 30 transmits a conveyance instruction to AGV server 50. The conveyance instruction includes a delivery destination (final destination), a cart ID, and an embarking sequence. The delivery destination is acquired from purchase order data. The cart ID is acquired by searching for a product ID matching the product ID of the purchase order data from the cart transfer data and also reading the cart ID associated with the searched product ID from the cart transfer data. The embarking sequence means an embarking sequence of multiple carts 43 to be embarked in luggage compartment 62 of corresponding delivery vehicle 61 when there are multiple delivery destinations of delivery vehicle 61. Here, putting of cart 43 in and out of delivery vehicle 61 using AGVs 51 and 52 is first in and last out. Accordingly, the embarking sequence of cart 43 is determined to be a reverse sequence of the delivery sequence. Furthermore, sales management server 30 transmits a delivery instruction to delivery vehicle server 60. In the present embodiment, the delivery instruction includes a delivery destination (final destination), a cart ID, and an embarking sequence, as in the conveyance instruction.

Figure 7:
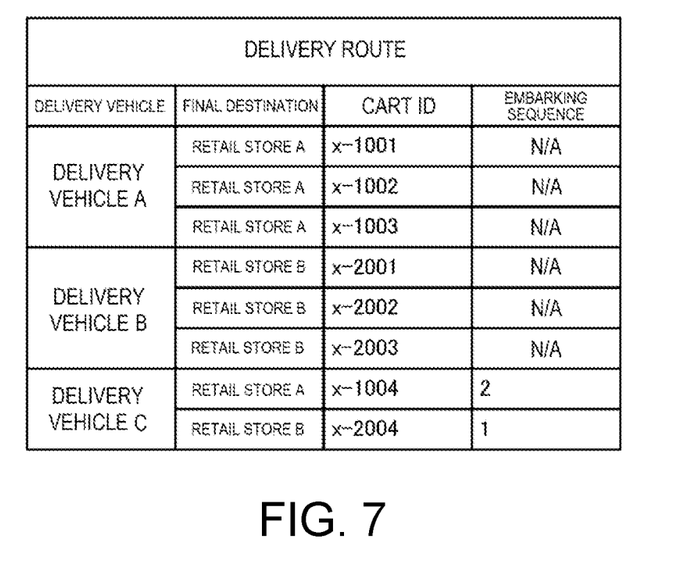
FIG. 7 is an explanatory diagram illustrating an example of delivery route data.

When receiving the delivery instruction, delivery vehicle server 60 selects (for example, selects a delivery vehicle closest to warehouse 40 among standby delivery vehicles 61) delivery vehicle 61 to be used for delivery from among multiple delivery vehicles 61 and generates a delivery route for selected delivery vehicle 61 and also transmits a moving instruction for moving warehouse 40 to delivery vehicle 61. FIG. 7 is an explanatory diagram illustrating an example of a delivery route. The delivery route includes a delivery destination (final destination), a cart ID of cart 43 to be embarked, and an embarking sequence of each cart 43. In addition, "N/A" as the embarking sequence means that cart 43 may be embarked in any sequence. Further, delivery vehicle server 60 receives a current position of delivery vehicle 61 and calculates an estimated arrival time until delivery vehicle 61 arrives at warehouse 40 based on the received current position. Then, delivery vehicle server 60 transmits a delivery arrangement completion report indicating that delivery arrangement is completed to AGV server 50. The delivery arrangement completion report includes information on which delivery vehicle 61 performs loading of cart 43 and an estimated arrival time at warehouse 40. The information on which delivery vehicle 61 performs the loading may be determined by AGV server 50.

When receiving a moving instruction from delivery vehicle server 60, delivery vehicle 61 moves toward warehouse 40, and when arriving at warehouse 40, delivery vehicle 61 transmits an arrival report to delivery vehicle server 60. The arrival report includes a parking position (delivery vehicle position) of delivery vehicle 61 in warehouse 40. When receiving the arrival report from delivery vehicle 61, delivery vehicle server 60 transmits, to AGV server 50, a loading permission that permits loading of cart 43 to delivery vehicle 61. The loading permission includes information on which delivery vehicle 61 performs loading of cart 43 and the delivery vehicle position.

When receiving the release instruction from sales management server 30 and receiving the delivery arrangement completion report from delivery vehicle server 60, AGV server 50 generates a conveyance route of AGV 51 and transmits a conveyance instruction to AGV 51. The conveyance instruction includes a cart ID, a cart position, and an estimated arrival time. When receiving the conveyance instruction, AGV 51 moves to the cart position, collates the cart ID by reading a barcode of cart 43 standing by at the cart position, and then picks up cart 43 and move to 61 a parking lot of delivery vehicle 61 in warehouse 40.

Figure 8:
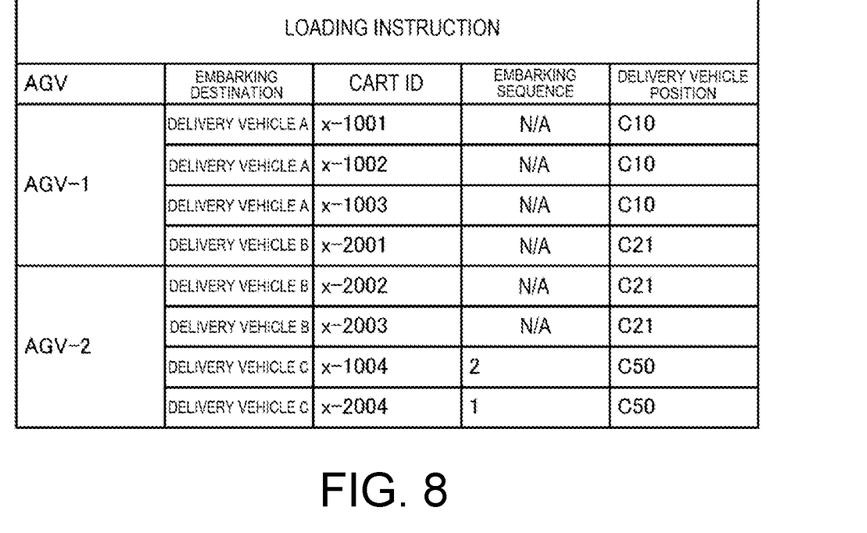
FIG. 8 is an explanatory diagram illustrating an example of loading instruction data.

Further, when receiving the loading permission from delivery vehicle server 60, AGV server 50 transmits a loading instruction (loading instruction data) for loading cart 43 to delivery vehicle 61 to AGV 51. FIG. 8 is an explanatory diagram illustrating an example of the loading instruction data. As illustrated in FIG. 8, the loading instruction data includes an embarking destination (information on which delivery vehicle 61 performs loading of cart 43), a cart ID, an embarking sequence, and a delivery vehicle position. When AGV 51 receives the loading instruction from AGV server 50 and arrives at the delivery vehicle position, the AGV 51 instructs delivery vehicle 61 standing by at the delivery vehicle position to open tailgate lifter 63. Delivery vehicle 61 opens tailgate lifter 63, and when opening of tailgate lifter 63 is completed, delivery vehicle 61 transmits a completion report to AGV 51. When receiving the completion report, the AGV 51 moves to luggage compartment 62 of delivery vehicle 61, loads cart 43 into luggage compartment 62, and exits from luggage compartment 62. Then, when the loading of cart 43 is completed, AGV 51 transmits a loading completion report indicating that loading work is completed to AGV server 50. The loading completion report includes a loading completion time. When receiving the loading completion report, AGV server 50 transmits the loading completion report to delivery vehicle server 60 and also transmits the release completion report indicating that release is completed to sales management server 30. The release completion report includes a release completion time (loading completion time).

When receiving the loading completion report from AGV server 50, delivery vehicle server 60 transmits a moving instruction for moving to the delivery destination to delivery vehicle 61. When receiving the moving instruction, delivery vehicle 61 closes tailgate lifter 63 and starts moving toward a designated delivery destination. Then, when arriving at a retail store which is the delivery destination, delivery vehicle 61 transmits an arrival report to delivery vehicle server 60. The arrival report includes a parking position (delivery vehicle position) of delivery vehicle 61 at the retail store of the delivery destination. When receiving the arrival report, delivery vehicle server 60 transmits unloading permission that permits unloading from luggage compartment 62 of delivery vehicle 61 to AGV server 50. The unloading permission includes information on which delivery vehicle 61 performs unloading and the delivery vehicle position.

Figure 9:
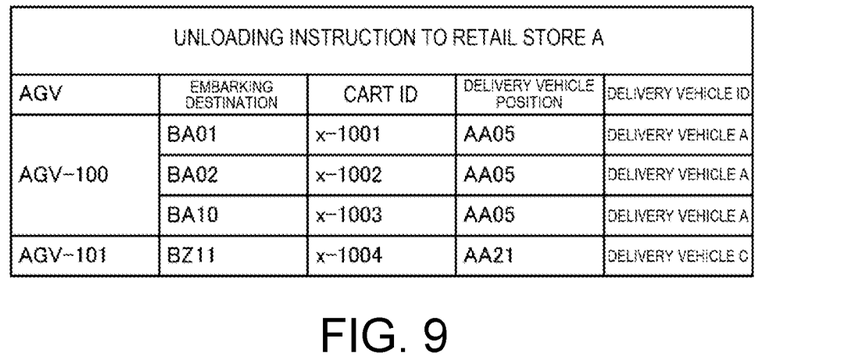
FIG. 9 is an explanatory diagram illustrating an example of unloading instruction data.
Figure 10:
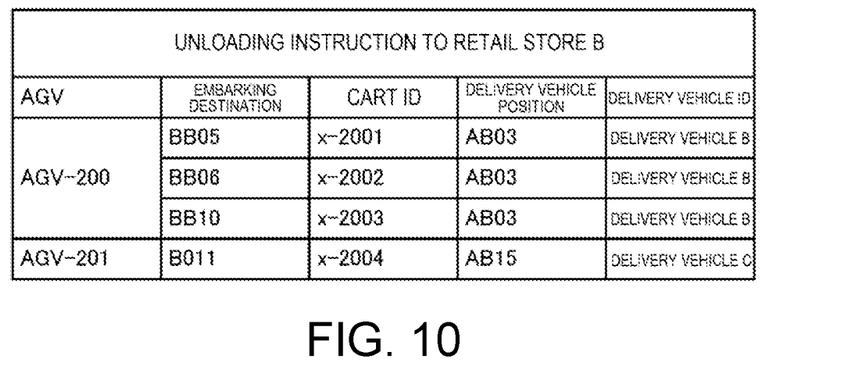
FIG. 10 is an explanatory diagram illustrating an example of unloading instruction data.

When receiving the unloading permission, AGV server 50 transmits an unloading instruction (unloading instruction data) to AGV 52 disposed in the designated delivery destination (retail store). FIGS. 9 and 10 are explanatory diagrams illustrating an example of unloading instruction data. FIG. 9 illustrates the unloading instruction data of retail store 20A, and FIG. 10 illustrates the unloading instruction data of retail store 20B. As illustrated in FIGS. 9 and 10, the unloading instruction data is generated for each delivery destination, and each piece of the unloading instruction data includes information (delivery vehicle ID) on which delivery vehicle 61 performs unloading, information (embarking destination) on where to place unloaded cart 43, cart ID, and a delivery vehicle position. When receiving the unloading instruction data, AGV 52 moves to the delivery vehicle position in retail store 20 of the delivery destination, and when arriving at the delivery vehicle position, AGV 52 instructs delivery vehicle 61 to open tailgate lifter 63. Delivery vehicle 61 opens tailgate lifter 63, and when the opening of tailgate lifter 63 is completed, delivery vehicle 61 transmits a completion report to AGV 52. When receiving the completion report, the AGV 52 unloads cart 43 from luggage compartment of delivery vehicle 61. When the unloading of cart 43 is completed, AGV 52 transmits an unloading completion report indicating that unloading work is completed to AGV server 50. Here, the unloading completion report includes a position where cart 43 is placed, and the like. When receiving the unloading completion report, AGV server 50 transmits the unloading completion report to delivery vehicle server 60 and also transmits the delivery completion report indicating that the delivery is completed to sales management server 30. The unloading completion report includes an unloading completion time. When receiving the unloading completion report, delivery vehicle server 60 transmits a moving instruction for moving to the next delivery destination to delivery vehicle 61 when there is a next delivery destination. When receiving the delivery completion report, sales management server 30 transmits the delivery completion report indicating that the delivery is completed to retail store computer 21 of the ordered retail store. The delivery completion report includes a delivery completion time (unloading completion time).

Here, a correspondence relationship between main elements of the embodiment and main elements of the present disclosure described in the scope of claims will be described. That is, warehouse 40 corresponds to a warehouse, delivery vehicle 61 corresponds to a delivery vehicle, AGV 51 corresponds to an automatic conveyance device, and AGV server 50 corresponds to an automatic conveyance device server. Further, AGV 52 corresponds to a second automatic conveyance device. Further, delivery vehicle server 60 corresponds to a delivery vehicle server.

It goes without saying that the present invention is not limited to the above-described embodiment and can be implemented in various aspects without departing from the technical scope of the invention of the present disclosure.

For example, in the above-described embodiment, sales management server 30 is assumed to manage inventory of product 42 stored in warehouse 40. However, warehouse computer 41 may manage the inventory of product 42.

Further, in the above-described embodiment, distribution system 10 is assumed to include AGV server 50 for managing operations of AGVs 51 and 52, and delivery vehicle server 60 for managing an operation of delivery vehicle 61. However, in the distribution system, operation management of AGVs 51 and 52 and operation management of delivery vehicle 61 may be performed by a single server.

Further, in the above-described embodiment, distribution system 10 is assumed to respectively dispose AGVs in warehouse 40 and retail store 20 (delivery destination). However, one of AGVs may board luggage compartment 62 of delivery vehicle 61 arrived at warehouse 40 together with cart 43 and may each be delivered together with cart 43 by delivery vehicle 61. In this case, when delivery vehicle 61 arrives at the delivery destination, the one of AGVs can be unloaded by getting off luggage compartment 62 as it is.

Further, in the above-described embodiment, sales management server 30 transmits a delivery instruction to delivery vehicle server 60 after receiving a release preparation completion report, but the delivery instruction may be transmitted to delivery vehicle server 60 before receiving the release preparation completion report. In this case, delivery vehicle server 60 cannot generate a delivery route because a cart ID and a cart position are unknown, but delivery vehicle server 60 can instruct delivery vehicle 61 to move to warehouse 40 prior to the generation of the delivery route.

As described above, a distribution system of the present disclosure is a distribution system linked to a delivery vehicle that delivers a product stored in a warehouse from the warehouse to a delivery destination, and includes an automatic conveyance device disposed in the warehouse and an automatic conveyance device server configured to manage an operation of the automatic conveyance device by exchanging information with the automatic conveyance device by wireless communication, in which, when receiving a request for delivery of a designated product to a designated delivery destination, the automatic conveyance device server transmits a release instruction to the automatic conveyance device, and when receiving loading permission that permits loading of the product to the delivery vehicle based on arrival of the delivery vehicle at a standby position in the warehouse, the automatic conveyance device server transmits a loading instruction for loading of a product to the delivery vehicle to the automatic conveyance device, and when receiving information indicating that release of the product is completed from the automatic conveyance device, the automatic conveyance device server transmits a release completion notification to a transmitter of a request for the delivery, and when receiving the release instruction from the automatic conveyance device server, the automatic conveyance device picks up the designated product in the warehouse, and when receiving the loading instruction from the automatic conveyance device server, the automatic conveyance device loads the picked-up product to the delivery vehicle standing by at the standby position of the warehouse, and when loading work is completed, the automatic conveyance device transmits information indicating that release is completed to the automatic conveyance device server.

A distribution system of the present disclosure is a system linked to a delivery vehicle that delivers a product stored in a warehouse from the warehouse to a delivery destination. A distribution system includes an automatic conveyance device disposed in a warehouse and an automatic conveyance device server that can perform wireless communication with the automatic conveyance device. An automatic conveyance device server transmits a release instruction to an automatic conveyance device when receiving a request for delivery of a designated product to a designated delivery destination. Further, an automatic conveyance device server transmits a loading instruction for loading of a product to a delivery vehicle to an automatic conveyance device when receiving loading permission that permits loading of the product to the delivery vehicle based on arrival of the delivery vehicle at a standby position in a warehouse. Further, an automatic conveyance device server transmits a release completion notification to a transmitter of a request for delivery when receiving information indicating that release of a product is completed from an automatic conveyance device. An automatic conveyance device picks up a designated product in a warehouse when receiving a release instruction from an automatic conveyance device server. Further, an automatic conveyance device loads a picked-up product to a delivery vehicle standing by at a standby position of a warehouse when receiving a loading instruction from an automatic conveyance device server, and transmits information indicating that release is completed to an automatic conveyance device server when loading work is completed. Thereby, a product can be smoothly and automatically released, and a more efficient distribution system can be made by being linked to a delivery vehicle that can perform automatic driving.

The distribution system of the present disclosure may further include second automatic conveyance devices respectively disposed in multiple delivery destinations and capable of wirelessly communicating with the automatic conveyance device server, in which, when receiving unloading permission that permits unloading of a product from the delivery vehicle based on arrival of the delivery vehicle at the designated delivery destination among the multiple delivery destinations, the automatic conveyance device server may further transmit an unloading instruction to the second automatic conveyance device disposed in the designated delivery destination, and when receiving information indicating that unloading work is completed from the second automatic conveyance device, the automatic conveyance device server may further transmit a delivery completion notification to a transmitter of a request for the delivery, and, when receiving the unloading instruction from the automatic conveyance device server, the second automatic conveyance device may unload a product from a delivery vehicle standing by at a standby position of the designated delivery destination, and when unloading work is completed, the second automatic conveyance device may transmit information indicating that the unloading work is completed to the automatic conveyance device server. By doing so, unloading of products can be automated, and a distribution system can be more efficient.

Further, the distribution system of the present disclosure may further include a delivery vehicle server configured to manage the operation of the delivery vehicle by exchanging information with the delivery vehicle by wireless communication, in which, when arriving at the standby position of the warehouse, the delivery vehicle may transmit information indicating arrival at the standby position of the warehouse to the delivery vehicle server, and when arriving at the standby position of the delivery destination, the delivery vehicle may transmit information indicating arrival at the standby position of the delivery destination to the delivery vehicle server, and when receiving information indicating arrival at the standby position of the warehouse from the delivery vehicle, the delivery vehicle server may transmit the loading permission to the automatic conveyance device server, and when receiving information indicating arrival at the standby position of the delivery destination, the delivery vehicle server may transmit the unloading permission to the automatic conveyance device server. By doing so, products can be smoothly delivered to a delivery vehicle by cooperation between an automatic conveyance device server and a delivery vehicle server.

Further, in the distribution system of the present disclosure, the automatic conveyance device may pick up and convey a cart on which the designated product is embarked in the warehouse, and the release instruction may include at least identification information of the cart associated with identification information of the designated product when the designated product is transferred to the cart, and the standby position of the cart, and when receiving the release instruction, the automatic conveyance device may read identification information from the cart at the standby position of the cart and check that the read identification information matches identification information of a cart included in the release instruction and then conveys the cart. By doing so, occurrence of an error in loading a product (a cart) can be reduced. In this case, the delivery vehicle can accommodate the multiple carts, and the loading instruction may include at least identification information of the carts, a loading sequence of the carts, and a standby position of the delivery vehicles. Further, in this case, the unloading instruction may include at least the identification information of the carts and the standby position of the delivery vehicle.

INDUSTRIAL APPLICABILITY

The present disclosure can be used in manufacturing industry of a distribution system, and the like.

What is claimed is:

1. A distribution system linked to a delivery vehicle that delivers a product stored in a warehouse from the warehouse to a delivery destination, comprising:
  a first automatic conveyance device disposed in the warehouse;
  an automatic conveyance device server configured to manage an operation of the first automatic conveyance device by exchanging information with the first automatic conveyance device by wireless communication;
  a delivery vehicle server configured to manage the operation of the delivery vehicle by exchanging information with the delivery vehicle by wireless communication; and
  second automatic conveyance devices respectively disposed in multiple delivery destinations and capable of wirelessly communicating with the automatic conveyance device server,
  wherein the automatic conveyance device server transmits a release instruction to the first automatic conveyance device when receiving a request for delivery of a designated product to a designated delivery destination, transmits a loading instruction for loading of the product to the delivery vehicle to the first automatic conveyance device when receiving loading permission that permits loading of the product to the delivery vehicle based on arrival of the delivery vehicle at a standby position in the warehouse, and transmits a release completion notification to a transmitter of a request for the delivery when receiving information indicating that release of the product is completed from the first automatic conveyance device,
  wherein the first automatic conveyance device picks up the designated product in the warehouse when receiving the release instruction from the automatic conveyance device server, loads the picked-up product to the delivery vehicle standing by at the standby position of the warehouse when receiving the loading instruction from the automatic conveyance device server, and transmits information indicating that release is completed to the automatic conveyance device server when loading work is completed,
  wherein the delivery vehicle server transmits the loading permission to the automatic conveyance device server when receiving information indicating arrival at the standby position of the warehouse from the delivery vehicle,
    wherein the first automatic conveyance device picks up and conveys a cart on which the designated product is embarked in the warehouse,
    wherein the release instruction includes at least identification information of the cart associated with identification information of the designated product when the designated product is transferred to the cart, and a standby position of the cart, wherein, when receiving the release instruction, the first automatic conveyance device reads identification information from the cart at the standby position of the cart and checks that the read identification information matches the identification information of the cart included in the release instruction and then conveys the cart, wherein the delivery vehicle is able to accommodate multiple carts, and wherein the loading instruction includes at least the identification information of the cart, a loading sequence of the cart, and a standby position of the delivery vehicle, wherein the automatic conveyance device server further transmits an unloading instruction to the second automatic conveyance device disposed in the designated delivery destination when receiving unloading permission that permits unloading of the product from the delivery vehicle based on arrival of the delivery vehicle at the designated delivery destination among the multiple delivery destinations, and transmits a delivery completion notification to the transmitter of a request for the delivery when receiving information indicating that unloading work is completed from the second automatic conveyance device, and wherein the second automatic conveyance device unloads the product from the delivery vehicle standing by at the standby position of the designated delivery destination when receiving the unloading instruction from the automatic conveyance device server, and transmits information indicating that the unloading work is completed to the automatic conveyance device server when the unloading work is completed, wherein the delivery vehicle transmits information indicating arrival at the standby position of the warehouse to the delivery vehicle server when arriving at the standby position of the warehouse, and transmits information indicating arrival at the standby position of the delivery destination to the delivery vehicle server when arriving at the standby position of the delivery destination from the delivery vehicle, and the delivery vehicle server transmits the unloading permission to the automatic conveyance device server when receiving information indicating arrival at the standby position of the delivery destination.

2. The distribution system according to claim 1, wherein the unloading instruction includes at least the identification information of the cart and the standby position of the delivery vehicle.

* * * * *